(12) United States Patent
Pittala et al.

(10) Patent No.: US 11,502,754 B2
(45) Date of Patent: Nov. 15, 2022

(54) EQUALIZING DEVICE FOR COMPENSATING RAPID STATE OF POLARIZATION CHANGES OF AN OPTICAL SIGNAL

(71) Applicant: Huawei Technologies Co., Ltd., Shenzhen (CN)

(72) Inventors: Fabio Pittala, Munich (DE); Maxim Kuschnerov, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/199,084

(22) Filed: Mar. 11, 2021

(65) Prior Publication Data
US 2021/0203416 A1 Jul. 1, 2021

Related U.S. Application Data

(63) Continuation of application No. PCT/EP2018/074466, filed on Sep. 11, 2018.

(51) Int. Cl.
*H04B 10/00* (2013.01)
*H04B 10/2507* (2013.01)
(Continued)

(52) U.S. Cl.
CPC ....... *H04B 10/2572* (2013.01); *H04B 7/0413* (2013.01); *H04B 10/6165* (2013.01); *H04B 10/6971* (2013.01)

(58) Field of Classification Search
CPC ............ H04B 10/2572; H04B 10/6165; H04B 10/6971; H04B 7/0413
(Continued)

(56) References Cited

U.S. PATENT DOCUMENTS 7,701,842 B2 4/2010 Roberts et al.
10,038,498 B1 7/2018 Fan et al.
(Continued)

FOREIGN PATENT DOCUMENTS

CN 101232358 A 7/2008
CN 101719796 A 6/2010
(Continued)

OTHER PUBLICATIONS

Xian Zhou et al. ("Polarization-Multiplexed DMT with IM-DD using 2x2 MIMO processing based on SOP estimation and MPBI elimination", IEEE Photonics Journal, vol. 7, No. 6, Dec. 2015). (Year: 2015).*
(Continued)

*Primary Examiner* — Mohammad R Sedighian
(74) *Attorney, Agent, or Firm* — Leydig, Voit & Mayer, Ltd.

(57) ABSTRACT

The invention presents an equalizing device, a corresponding method and an optical signal with a frame structure for enabling the method. The equalizing device includes a first 2×2 MIMO equalizer configured to perform a first equalization on the digital signal, supported by a 2×2 MIMO channel estimation of the channel based on the digital signal. Further, the device includes a second 2×2 MIMO equalizer, arranged after the first equalizer and configured to perform a second equalization on the digital signal, supported by a State of Polarization (SOP) estimation of the optical signal based on the digital signal.

13 Claims, 9 Drawing Sheets

(51) Int. Cl.
 H04B 7/0413 (2017.01)
 H04B 10/61 (2013.01)
 H04B 10/69 (2013.01)
(58) Field of Classification Search
 USPC ........................................................ 398/152
 See application file for complete search history.

(56) References Cited

U.S. PATENT DOCUMENTS

| | | | |
|---|---|---|---|
| 11,212,009 B2* | 12/2021 | Hueda | H04B 10/6162 |
| 2012/0002979 A1 | 1/2012 | Xie | |
| 2012/0213510 A1 | 8/2012 | Stojanovic | |
| 2012/0263467 A1* | 10/2012 | Cvijetic | H04J 14/06 398/65 |
| 2015/0304025 A1 | 10/2015 | Liu et al. | |
| 2016/0142153 A1 | 5/2016 | Zamani et al. | |
| 2017/0155448 A1 | 6/2017 | Krishnan et al. | |

FOREIGN PATENT DOCUMENTS

| | | | | |
|---|---|---|---|---|
| CN | 102821079 A | | 12/2012 | |
| CN | 102971975 A | | 3/2013 | |
| CN | 103685109 A | | 3/2014 | |
| CN | 103812806 A | | 5/2014 | |
| CN | 104253773 A | | 12/2014 | |
| CN | 104321989 A | | 1/2015 | |
| CN | 104348544 A | | 2/2015 | |
| CN | 105284065 A | | 1/2016 | |
| CN | 105612700 A | | 5/2016 | |
| CN | 106464649 A | | 2/2017 | |
| CN | 106688199 A | | 5/2017 | |
| CN | 106992835 A | | 7/2017 | |
| CN | 107078982 A | | 8/2017 | |
| CN | 107078988 A | | 8/2017 | |
| CN | 107113258 A | | 8/2017 | |
| CN | 107809282 A | | 3/2018 | |
| JP | 2012522439 A | | 9/2012 | |
| JP | 2013168983 A | | 8/2013 | |
| JP | 2013223128 A | | 10/2013 | |
| TW | 202044786 | * | 1/2020 | H04B 10/60 |
| WO | 2009070881 A1 | | 6/2009 | |
| WO | 2013102898 A1 | | 7/2013 | |
| WO | WO 2013/152739 A1 | * | 10/2013 | H04B 10/532 |
| WO | 2013185845 A1 | | 12/2013 | |
| WO | 2015087494 A1 | | 6/2015 | |
| WO | 2017033550 A1 | | 3/2017 | |
| WO | 2017220153 A1 | | 12/2017 | |

OTHER PUBLICATIONS

Hao et al., "Research on MIMO-OFDM Technology Based on PDM Method for 5G Systems," pp. 34-38 (Sep. 25, 2015). With English Abstract.

Zhou et al., "Polarization-Multiplexed DMT With IM-DD Using 2 x 2 MIMO Processing Based on SOP Estimation and MPBI Elimination," XP011592801, IEEE Photonics Journal, vol. 7, No. 6, total 13 pages (Dec. 2015).

"Are Ultrafast SOP Events Affecting Your Coherent Receivers," newridgetech.com, Posted on Feb. 16, 2016, URL:https://newridgetech.com/are-ultrafast-sop-events-affecting-your-receivers/, total 6 pages.

Pittalà et al., "Training based Channel Estimation for Signal Equalization and OPM in 16-QAM Optical Transmission Systems," ECOC Technical Digest, XP032543886, 2012 OSA, total 3 pages (2012).

Gamerota et al., "Current Waveforms for Lightning Simulation," IEEE Transactions On Electromagnetic Compatibility, vol. 54, No. 4, pp. 880-888, Institute of Electrical and Electronics Engineers, New York, New York (Aug. 2012).

Krummrich et al., "Demanding response time requirements on coherent receivers due to fast polarization rotations caused by lightning events," Optics Express, vol. 24, No. 11, total 16 pages (May 2016).

Pittalà et al., "Efficient Training-Based Channel Estimation for Coherent Optical Communication Systems," Advanced Photonics Congress, OSA, total 2 pages (2012).

Pietralunga et al., "Fast Polarization Effects in Optical Aerial Cables Caused by Lightning and Impulse Current," IEEE Photonics Technology Letters, vol. 16, No. 11, pp. 2583-2585, Institute of Electrical and Electronics Engineers, New York, New York (Nov. 2004).

Charlton et al., "Field measurements of SOP transients in OPGW, with time and location correlation to lightning strikes," Optics Express 9689, vol. 25, No. 9, total 8 pages (May 1, 2017).

Pittalà et al., "Laboratory Measurements of SOP Transients due to Lightning Strikes on OPGW Cables," OFC 2018 OSA 2018, total 3 pages (2018).

"Lightning Affects Coherent Optical Transmission in Aerial Fiber," URL:https://www.lightwaveonline.com/network-design/high-speed-networks/article/16654079/lightning-affects-coherent-optical-transmission-in-aerial-fiber, total 11 pages, Lightwave (Mar. 2, 2016).

Pittalà et al., "Training-Aided Frequency-Domain Channel Estimation and Equalization for Single-Carrier Coherent Optical Transmission Systems," Journal of Lightwave Technology, vol. 32, No. 24, pp. 4849-4863, (Dec. 15, 2014).

Kurono et al., "Transient state of polarization in optical ground wire caused by lightning and impulse current," Proceedings of SPIE, vol. 2873, total 5 pages (Aug. 1996).

Gibbemeyer et al., "When Lightning Strikes: Why Fast SOP Tracking is Important," Posted on Mar. 1, 2018, URL: https://acacia-inc.com/blog/when-lightning-strikes-why-fast-sop-tracking-is-important/, total 3 pages.

JP/2021-537479, Notice of Reasons for Rejection, dated May 30, 2022.

Japanese Notice of Reasons for Rejection for Application No. 2021-537479, dated May 30, 2022, total 13 pages. With English Translation.

* cited by examiner

EQUALIZING DEVICE FOR COMPENSATING RAPID STATE OF POLARIZATION CHANGES OF AN OPTICAL SIGNAL

CROSS-REFERENCE TO RELATED APPLICATIONS

This application is a continuation of International Application No. PCT/EP2018/074466, filed on Sep. 11, 2018, the disclosure of which is hereby incorporated by reference in its entirety.

TECHNICAL FIELD

The present invention generally relates to processing a digital signal, particularly performing equalization on the digital signal. The digital signal is specifically derived from an optical signal transmitted over a channel, and thus the invention also relates to channel estimation. The invention is concerned especially with performing equalization on the digital signal in the presence of rapid State of Polarization (SOP) changes of the optical signal, and thus the invention also relates to SOP estimation. The invention can be applied in the field of Optical Ground Wire (OPGW) cables.

The invention proposes an equalizing device, an optical receiver including the equalizing device, and an equalization method to be performed, for example, by the equalizing device or the optical receiver. The invention also proposes an optical signal including frames having a frame structure that enables the equalization of the rapid SOP changes.

BACKGROUND

Amongst other technologies, OPGW cables have been used on overhead power transmission lines for grounding, in order to realize lightning protection. In addition to the grounding, the OPGW cables allow for a cheap deployment of optical fiber cables, which are placed in metal tubes in the center of the OPGW cables, and are shielded by one or more layers of armoring wires.

However, in recent years, field and laboratory measurements indicated that a magnetic field, which is generated along the axis of the conductors by a lightning induced current, changes the SOP of the light in the optical fiber very rapidly. This becomes an issue, especially when using coherent optical polarization multiplexed transmission schemes. An initial assessment of the potential impact on the tracking abilities of coherent digital signal processing (DSP) integrated circuits was made, and the SOP speed due to lightning strikes was estimated to be of the order of a few megaradians per second (Mrad/s).

Recent field trials confirmed this phenomenon, and measured SOP speeds up to 5.1 Mrad/s, although it was impossible to correlate the magnitude of the lightning induced current with the speed of the SOP change. Therefore, in recent laboratory experiments, systematic setups were developed, in order to measure the SOP on two types of OPGW cables under lighting induced currents up to and above 150 ka. Fast SOP speeds exceeding 8 Mrad/s were measured. In this respect, it is known from lightning modelling that 1% of negative first strokes of lightning show a peak current of at least 150 ka, and can even reach values up to 500 ka in some extreme cases.

Fast SOP changes are particularly an issue when using coherent optical polarization multiplexed transmission schemes with, e.g., 100 Gigabits per second (Gb/s) or higher.

Since most commercial digital signal processors are designed to withstand SOP changes caused by mechanical vibrations, the SOP tracking capabilities are often only in the hundreds of kiloradians per second (krad/s). Therefore, the industry arrived at a consensus that lightning strikes into OPGW cables can lead to traffic interruptions in metro and long-haul networks.

Most DSP application specific circuits (asics) available in the market use 2×2 multiple input multiple output (MIMO) equalizers based on gradient algorithms, such as the constant-modulus algorithm or the decision-directed least-mean-square (DD-LMS) algorithm. Considering also other processing algorithms, it seems possible to design 100G DP-QPSK DSP-asics able to track SOP rotation speeds up to a few hundred of krad/s, covering most of the SOP transients occurring in buried fiber links and some cases of lightning. For higher-order Quadrature Amplitude Modulation (QAM), the SOP tracking capability of such DSP devices is drastically reduced.

While DSP based on 2×2 MIMO channel estimation improves the performance of the 2×2 MIMO equalizer, ultra-fast SOP rotation speeds due to currents induced by lightning on aerial fiber links cannot be tracked and compensated, unless unpractical training-overhead is used.

SUMMARY

In view of the above-mentioned issues, the invention aims to improve the tracking and compensating of SOP changes. The invention has the objective to provide an equalizing device and method, particularly based on 2×2 MIMO equalization, capable of tracking and compensating fast SOP changes (in the order of Mrad/s) of an optical signal. For instance, to track and compensate SOP changes caused by lightning strikes into OPGW cables. The invention also aims for digital signal processing on a digital signal derived from the optical signal to compensate the rapid SOP changes. Thereby, the invention aims for an efficient implementation of the equalization and combination with other conventional equalization.

In particular, the invention proposes combining two successive 2×2 MIMO equalizers or 2×2 MIMO equalization steps, in order to process a digital signal derived from an optical signal, and thereby to compensate fast SOP changes of the optical signal. Further, the invention proposes a frame structure for an optical signal, wherein the frame structure supports 2×2 MIMO channel estimation and SOP estimation of the equalizers, respectively to support the processing of the digital signal.

A first aspect of the invention provides an equalizing device configured to process a digital signal derived from an optical signal transmitted over a channel, the equalizing device comprising a first 2×2 MIMO equalizer configured to perform a first equalization on the digital signal, supported by a 2×2 MIMO channel estimation of the channel based on the digital signal, and a second 2×2 MIMO equalizer, arranged after the first equalizer, configured to perform a second equalization on the digital signal, supported by SOP estimation of the optical signal based on the digital signal.

The channel may comprise an optical fiber, notably an optical fiber surrounded at least partly by an electrically conductive shield. In an embodiment, the SOP estimation may be based on the digital signal output by the first 2×2 MIMO equalizer.

This device of the first aspect may particularly include two 2×2 MIMO equalizers, and is able to compensate also very fast SOP changes. In particular, the first 2×2 MIMO equalizer is able to compensate chromatic dispersion (CD), polarization-mode dispersion (PMD), and slower changes of the SOP of the optical signal, whereas the second 2×2 MIMO equalizer is able to completely remove the effect of faster SOP changes (rotations in the order of Mrad/s). Since the two 2×2 MIMO equalizers are based on 2×2 MIMO channel estimation and SOP estimation, respectively, no feedback loops are required, thus naturally allowing the tracking of the faster SOP changes (which would not be easily possible with an architecture requiring a feedback loop for error calculation). In an embodiment, the two 2×2 MIMO equalizers are not coupled to one another.

The equalizing device further allows for a particularly efficient parallel implementation, as the equalization has a feed-forward structure. The equalization can moreover be de-coupled from carrier recovery (i.e. Carrier frequency/phase estimation and compensation). The equalizing device is also of low complexity.

In an implementation form of the first aspect, the first equalizer is configured to, by performing the first equalization, compensate residual CD, PMD, and slower changes of the SOP of the optical signal, and the second equalizer is configured to, by performing the second equalization, compensate faster changes of the SOP of the optical signal.

Thus, the digital signal can be efficiently and entirely equalized for CD, PMD and all sorts of slower and faster SOP changes (rotations up to Mrad/s).

In a further implementation form of the first aspect, the first equalizer and/or the second equalizer are training-aided equalizers.

For example, the first equalizer may be configured to perform the 2×2 MIMO channel estimation of the channel based on a training sequence contained in the digital signal. This training sequence is referred to herein as a first training sequence. Performing the 2×2 MIMO channel estimation yields an estimate of the channel state. The first equalizer can thus perform the first equalization based on the estimate of the channel state, i.e. The first equalization is supported by the 2×2 MIMO channel estimation. Additionally or alternatively, the second equalizer may be configured to perform the SOP estimation of the optical signal based on another training sequence contained in the digital signal. This training sequence is referred to herein as a second training sequence. Performing the SOP estimation yields an SOP estimate. The second equalizer can thus perform the second equalization based on the SOP estimate, i.e. The second equalization is supported by the SOP estimation. The first training sequence may differ from, particularly be longer than (e.g., contain more symbols), the second training sequence.

Since the 2×2 MIMO channel estimation may be performed based on every training sequence, the equalizer architectures allow accessing the channel also during the very fast SOP transients. All benefits of training-aided channel estimation are furthermore preserved. The equalization is modulation format transparent, i.e. The constellation plot of the payload data can be different than that of the training-sequences.

In a further implementation form of the first aspect, the first equalizer is configured to perform the 2×2 MIMO channel estimation based on a first training sequence contained in the digital signal, and the second equalizer is configured to perform the SOP estimation based on a second training sequence contained in the digital signal.

By means of these training sequences, the device can efficiently remove effects of SOP rotations from the digital signal (slower and faster). The second training sequence may differ from the first training sequence. The first training sequence and the second training sequence may each be contained in a baseband signal carried by the digital signal. For example, the digital signal may be a sampled version of a radio frequency (RF) signal carried by the optical signal. The RF signal and thus the digital signal may carry a baseband signal, which contains the first and the second training sequences. The baseband signal may further carry payload data.

In a further implementation form of the first aspect, the first equalizer is configured to perform the 2×2 MIMO channel estimation based on a longer training sequence included in a frame of the optical signal, and the second equalizer is configured to perform the SOP estimation individually for each of multiple shorter training sequences included (e.g., periodically) in the frame.

In the present disclosure, a sequence generally means a succession of adjoining symbols. Accordingly, every symbol located between an initial (i.e. First) symbol and a final (i.e. Last symbol) of the sequence is also an element of the sequence. Further, any first sequence and any second sequence which are mentioned within a same paragraph of the present disclosure or related to each other and which are referred to as a "longer" sequence and a "shorter" sequence, respectively, are understood to be longer and shorter, respectively, in the sense that the first sequence is longer than the second sequence (in other words, in the sense that the second sequence is shorter than the first sequence). The same applies similarly to any other nouns with opposite attributes in the comparative form if mentioned in a same paragraph or context of the present disclosure. For example, "faster changes" and "slower changes" are faster and slower, respectively, not in absolute terms but in comparison with each other.

In a further implementation form of the first aspect, the second equalizer is configured to, by performing the SOP estimation for a given shorter training sequence, perform the second equalization for a data sequence arranged directly before the given shorter training sequence and for a data sequence arranged directly after the given shorter training sequence in the frame structure.

Thus, faster SOP rotations (many Mrad/s) of the optical signal can be efficiently tracked and compensated in the digital signal by the equalizing device.

In a further implementation form of the first aspect, the training sequences are based on Perfect-Square Minimum-Phase Constant-Amplitude Zero-Autocorrelation (PS-MP CAZAC) code.

Such training sequences lead to very good equalization results.

In a further implementation form of the first aspect, the first equalizer is implemented in the frequency domain (FD) or in the time domain (TD) and/or the second equalizer is implemented in the FD or in the TD.

In a further implementation form of the first aspect, the equalizing device further comprises a CD equalizer arranged before the first equalizer and configured to perform equalization on the digital signal, supported by a CD estimation of the optical signal based on the digital signal.

The CD estimation and equalization performed on the digital signal may remove most of the CD in the optical signal. Any residual CD may be removed by the first equalizer.

In a further implementation form of the first aspect, the equalizing device comprises a dual-stage equalizer, including the CD equalizer and the first equalizer, and the second equalizer.

In a further implementation form of the first aspect, the equalizing device comprises a single-stage equalizer including the CD equalizer and the first equalizer and the second equalizer.

In a further implementation form of the first aspect, the equalizing device further comprises one or more Digital Signal Processing (DSP) units configured to perform digital signal processing on the digital signal, particularly processing for symbol detection and/or processing of fractional oversampled data.

A second aspect of the invention provides an optical receiver, particularly coherent optical receiver, including an equalizing device according to the first aspect or any of its implementation forms, wherein the optical receiver is configured to receive the optical signal over the channel and to derive the digital signal from the optical signal.

In an embodiment, the optical receiver is configured to derive the digital signal from the optical signal by deriving a RF signal from the optical signal and sampling the RF signal. For example, the optical receiver may comprise a coherent detector configured to derive the RF signal from the optical signal, and an Analog-to-Digital Converter (ADC) for sampling the RF signal. The digital signal will in this case be a sampled version of the RF signal derived from the optical signal.

A third aspect of the invention provides a method for processing a digital signal derived from an optical signal transmitted over a channel, the method comprising performing a first 2×2 MIMO equalization on the digital signal, supported by a 2×2 MIMO channel estimation of the channel based on the digital signal, and performing a second 2×2 MIMO equalization on the digital signal, supported by a SOP estimation of the optical signal based on the digital signal.

In an implementation form of the third aspect, the method further comprises, by performing the first equalization, compensating residual CD, PMD, and slower changes of the SOP of the optical signal, and comprises, by performing the second equalization, compensating faster changes of the SOP of the optical signal.

In a further implementation form of the third aspect, the first equalization and/or the second equalization are training-aided equalizations.

In a further implementation form of the third aspect, method comprises performing the 2×2 MIMO channel estimation based on a first training sequence contained in the digital signal, and performing the SOP estimation based on a second training sequence contained in the digital signal.

In a further implementation form of the third aspect, the method comprises performing the 2×2 MIMO channel estimation based on a longer training sequence included in a frame of the optical signal, and comprises performing the SOP estimation individually for each of multiple shorter training sequences included (e.g., periodically) in the frame.

In a further implementation form of the third aspect, the method comprises, by performing the SOP estimation for a given shorter training sequence, performing the second equalization for a data sequence arranged directly before the given shorter training sequence and for a data sequence arranged directly after the given shorter training sequence in the frame structure.

In a further implementation form of the third aspect, the training sequences are based on Perfect-Square Minimum-Phase Constant-Amplitude Zero-Autocorrelation (PS-MP CAZAC) code.

In a further implementation form of the third aspect, method is implemented in the Frequency Domain (FD) or Time Domain (TD).

In a further implementation form of the third aspect, the method further comprises performing equalization on the digital signal, supported by a CD estimation of the optical signal based on the digital signal.

In a further implementation form of the third aspect, method is carried out by a dual-stage equalizer.

In a further implementation form of the third aspect, the method is carried out by a single-stage equalizer.

In a further implementation form of the third aspect, the method further comprises performing DSP on the digital signal, particularly processing for symbol detection and/or processing of fractional oversampled data.

The method of the third aspect and its implementation forms achieve the advantages described above for the device of the first aspect and it respective implementation forms.

A fourth aspect of the invention provides an optical signal comprising a sequence of frames, each frame including a plurality of data sequences, a longer training sequence for 2×2 MIMO channel estimation of a transmission channel over which the optical signal is transmitted, and a plurality of shorter training sequences for SOP estimation of the optical signal, wherein a shorter training sequence is arranged between each two subsequent data sequences.

Further aspects of the invention provide a method of generating an optical signal to be transmitted over a channel, or an optical signal generator for generating an optical signal to be transmitted over a channel, or a method of transmitting an optical signal over a channel, or a method of processing an optical signal transmitted over a channel, or a processing device for processing an optical signal transmitted over a channel, wherein the optical signal includes a sequence of frames, each frame including a plurality of data sequences, a longer training sequence for 2×2 MIMO channel estimation of the channel, and a plurality of shorter training sequences for SOP estimation of the optical signal, wherein a shorter training sequence is arranged between each two subsequent data sequences.

The optical signal generator may be configured to generate the optical signal by modulating a RF signal with a digital signal that includes the sequence of frames, and modulating an optical carrier signal with the modulated RF signal.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
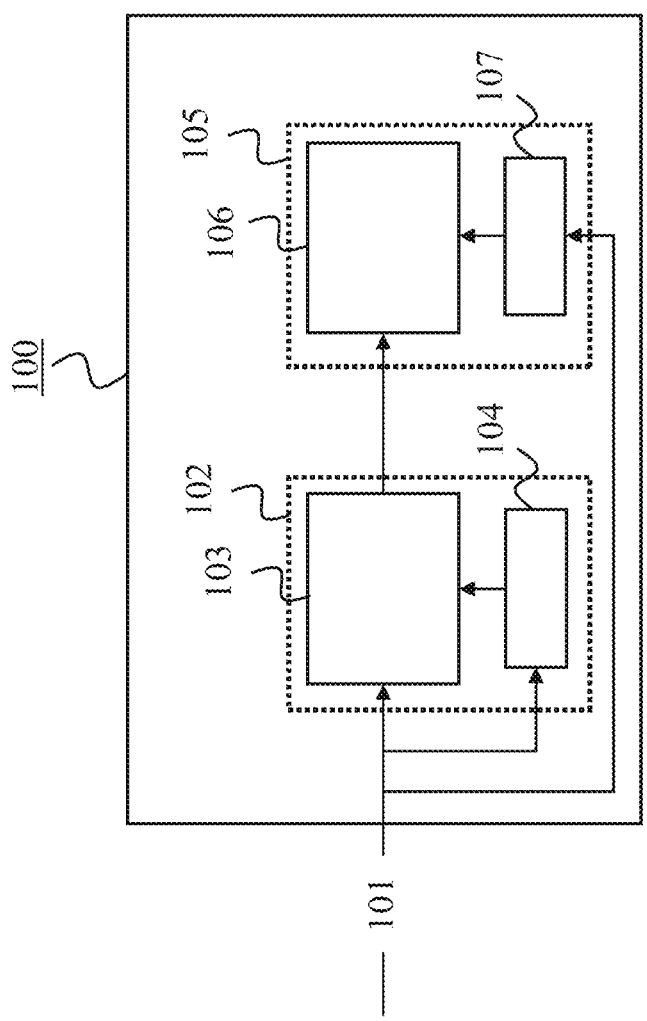
FIG. 1 shows an equalizing device according to an embodiment of the invention.

FIG. 1 shows an equalizing device 100 according to an embodiment of the invention. The equalizing device 100 is particularly configured to process a digital signal 101. The digital signal 101 is derived, e.g., may be generated from, e.g., by an optical receiver 200, from an optical signal 201 transmitted over a transmission channel 202 (see FIG. 2).

The device 100 comprises a first 2×2 MIMO equalizer 102 and a second 2×2 MIMO equalizer 105, which is arranged after the first equalizer 102. The first equalizer 102 and the second equalizer 105 may thereby be decoupled from another.

The first 2×2 MIMO equalizer 102 is configured to perform a first equalization 103 on the digital signal 101. The first equalization 103 is supported by a 2×2 MIMO channel estimation 104 of the channel 202 based on the digital signal 101. In particular, the first equalization 103 takes a channel estimation result (i.e. An estimate of the channel state) as an input. The second 2×2 MIMO equalizer 105 is configured to perform a second equalization 106 on the digital signal 101. The second equalization 106 is supported by a SOP estimation 107 of the optical signal 201 based on the digital signal 101. In particular, the second equalization takes a SOP estimation result (i.e. An SOP estimate) as an input.

The equalizing device 100 is configured to, by means of the first equalizer 102, compensate residual CD, PMD, and slower changes of the SOP of the optical signal 201, and is configured to, by means of the second equalizer 105, compensate faster changes of the SOP of the optical signal 201.

Figure 2:
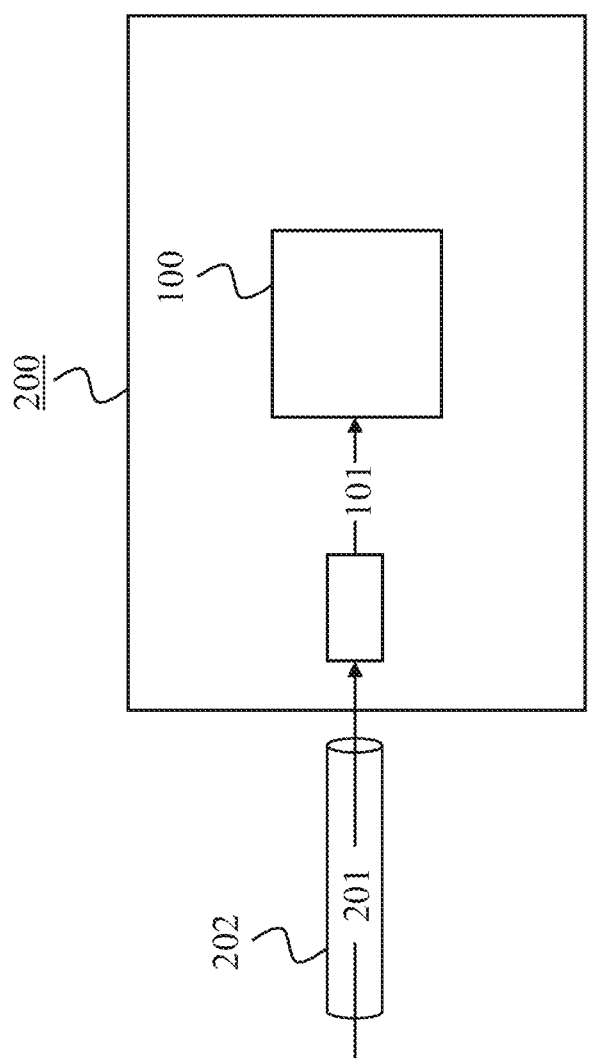
FIG. 2 shows an optical receiver according to an embodiment of the invention.

FIG. 2 shows an optical receiver 200 according to an embodiment of the invention. The optical receiver 200 includes at least one device 100 as shown in FIG. 1. The optical receiver 200 may particularly be a coherent optical receiver, i.e. May be a receiver configured to receive and process a coherent optical signal.

The optical receiver 200 is configured to receive the optical signal 201 over the transmission channel 202, and to derive, e.g., generate, the digital signal 101 from the received optical signal 201. For instance, the optical receiver 200 may to this end comprise a coherent detector configured to derive an RF signal from the optical signal 201, and may further comprise an ADC configured to sample the RF signal. The digital signal 101 may in this case be a sampled version of the RF signal derived from the optical signal 201.

The optical receiver 200 is configured to, by means of the equalizing device 100, compensate CD, PMD, as well as slower and faster changes of the SOP of the optical signal 201.

Figure 3:
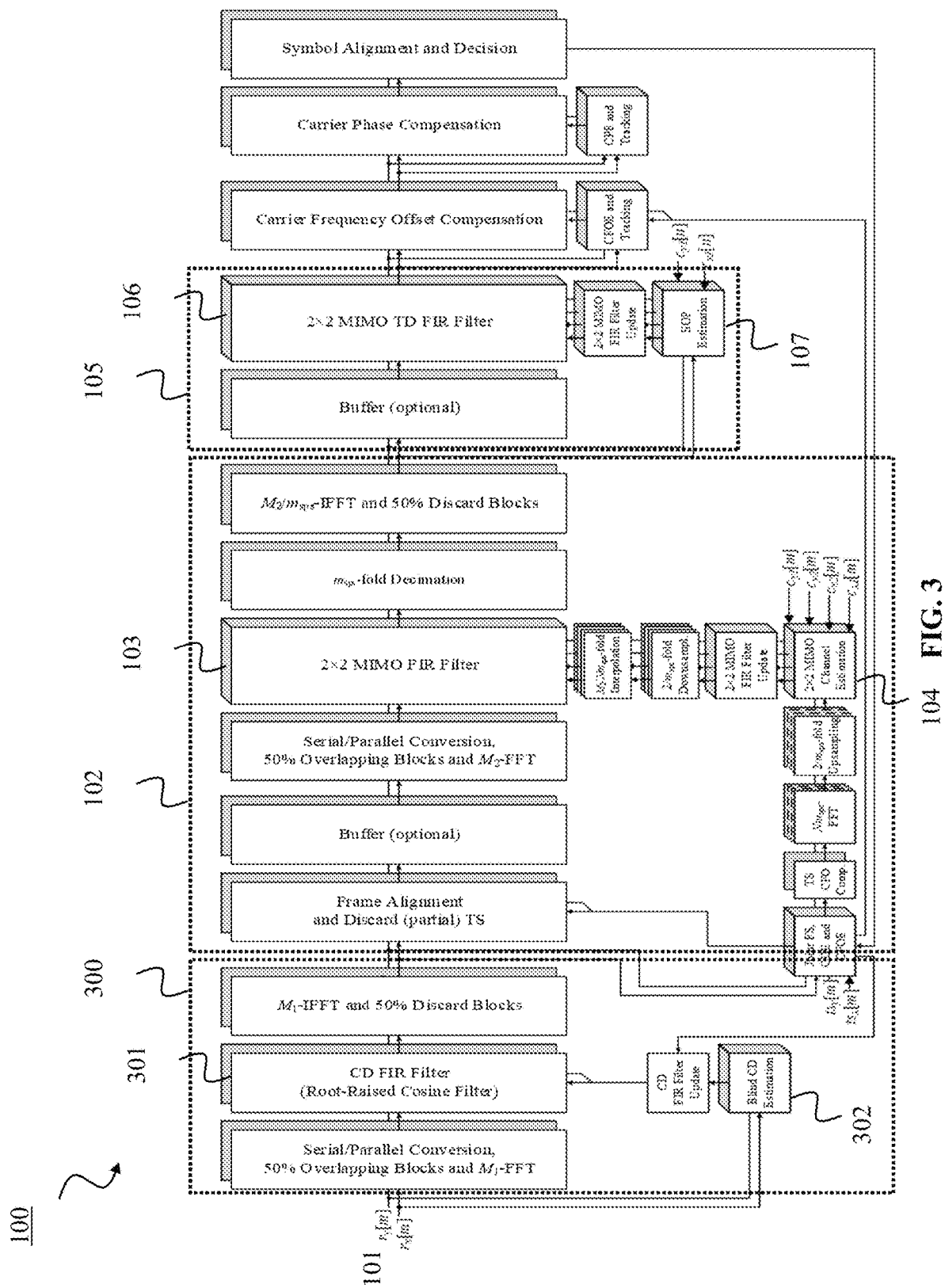
FIG. 3 shows an equalizing device according to an embodiment of the invention.
Figure 4:
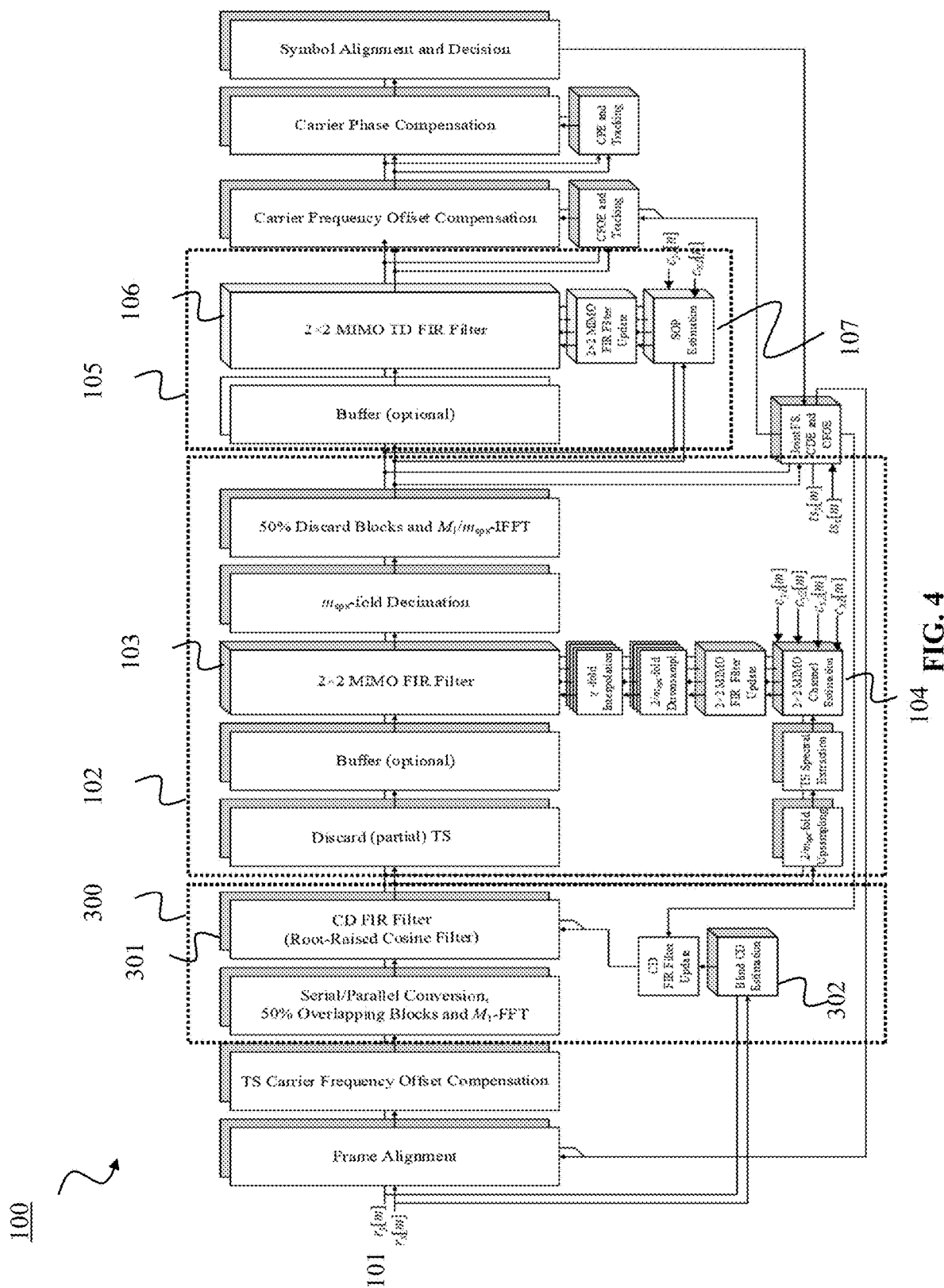
FIG. 4 shows an equalizing device according to an embodiment of the invention.

FIG. 3 and FIG. 4 each show an equalizing device 100 according to an embodiment of the invention. Each equalizing device 100 builds on the equalizing device 100 shown in FIG. 1. Accordingly, same elements in FIG. 1 and in FIG. 3 or FIG. 4 are labeled with the same reference signs and function likewise.

In particular, two possible structures for the equalizing device 100 of FIG. 1 are shown in FIG. 3 and FIG. 4, respectively. In both examples, the equalizing device 100 comprises a CD equalizer 300 and the two 2×2 MIMO equalizers 102 and 105 shown in FIG. 1. The CD equalizer 300 is used for performing CD equalization 301 on the input digital signal 101, wherein the CD equalization 301 is supported by a CD estimation 302 of the optical signal 201 based on the digital signal 101. That is, the CD equalization 301 takes a CD estimation result as an input. The first equalizer 102 is used for compensating residual CD, PMD, and slower changes of the SOP of the optical signal 201. The second equalizer 105 is used for compensating faster changes of the SOP of the optical signal 201. The first and second equalizers 102 and 105 can, respectively, be implemented either in FD or in TD.

FIG. 3 shows specifically an equalizing device 100 comprising a dual-stage frequency-domain equalizer (FDE) followed by a SOP time-domain equalizer (TDE). FIG. 4 shows specifically an equalizing device 100 comprising a single-stage FDE followed by a SOP TDE. The 2×2 MIMO equalizers 102 and 105 (in FIG. 3 and also in FIG. 4) are training-aided equalizers, i.e. They are arranged to do the 2×2 MIMO channel estimation 104 and the SOP estimation 107, respectively, based on one or more training sequences. For instance, the 2×2 MIMO channel estimation 104 may be based on a first training sequence and the SOP estimation 107 may be based on a second training sequence. Each or both of the first and second training sequences may be contained in the digital signal 101. The first and second training sequences may be either or both based on PS-MP CAZAC code.

Both equalizing devices 100 as illustrated in FIG. 3 and FIG. 4, respectively, include also DSP units or modules, which are, for instance, used for symbols detection and/or allowing processing fractional oversampled data. In particular, DSP units of the equalizing devices 100 shown in FIG. 3 and FIG. 4, respectively, include units for carrying out at least one of serial/parallel conversion, an Overlap-Discard (OLD) method, Fast Fourier Transform (FFT) or inverse FFT (IFFT), Frame Alignment, Folding Decimation, signal buffering, carrier frequency offsetting, carrier phase compensation, symbol alignment or the like.

Equalization performed in the FD may particularly be based on the OLD method, which includes transferring 50% overlapping blocks of the serial data (of the data signal 101) into FD by a discrete FFT, applying a compensating function to each block, transferring the signal back into TD by discrete inverse FFT (IFFT), and cutting off the overlap to restore the serial data signal 101. For an efficient hardware implementation, the oversampling factor $m_{sps}$ Should be chosen such that $$\mod\{Nm_{sps},2\}=0,$$

With $\{0<m_{sps}\leq 2\}$ And with N is the length of the PS-MP CAZAC sequence (first or second training sequence).

Figure 5:
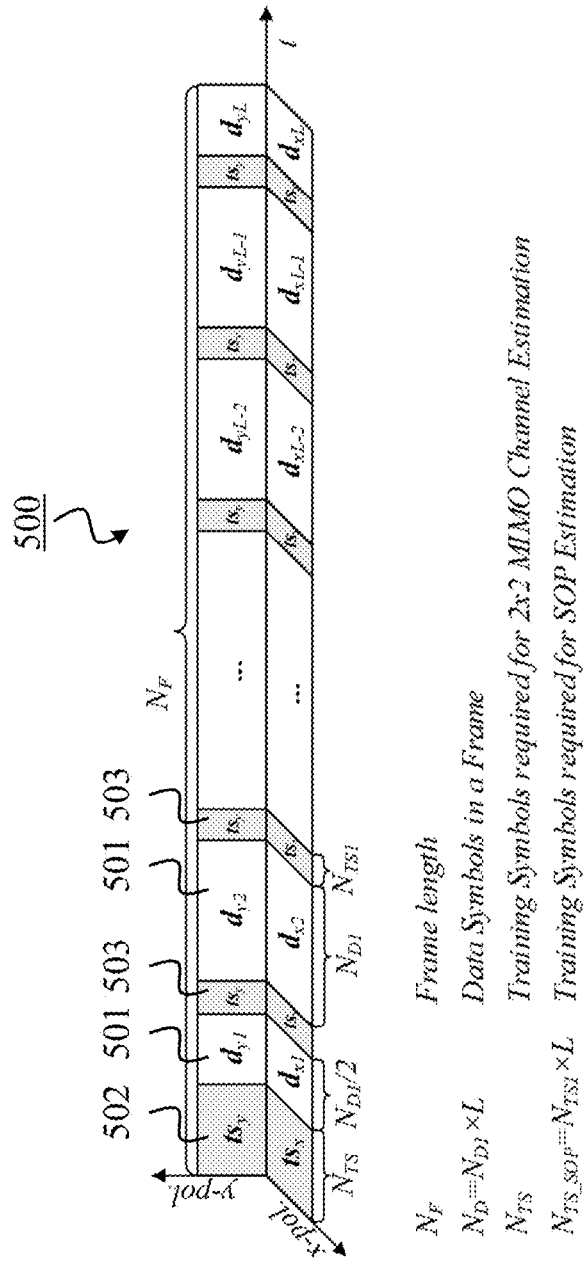
FIG. 5 shows a structure of a frame for an optical signal according to an embodiment of the invention.

FIG. 5 shows the structure of a frame 500 of an optical signal 201 according to an embodiment of the invention. The optical signal 201 typically includes a sequence of such frames 500. The frame 500 includes a plurality of data sequences 501, a longer training sequence 502 and a plurality of shorter training sequences 503. The shorter training sequences 503 are arranged such in the frame 500 that a shorter training sequence 503 is arranged between each two subsequent (along the time axis) data sequences 501. The longer training sequence 502 may be arrange before the data sequences 501 and shorter training sequences 503, respectively.

The longer training sequence 502 can be used for 2×2 MIMO channel estimation 104 of the channel 202, over which the optical signal 201 is transmitted. That means, the longer training sequence 502 can be provided as an input to the first equalizer 102 of the device 100 shown in FIG. 1, 3 or 4, in particular for performing the 2×2 MIMO channel estimation 104. In other words, the longer training sequence 502 is a suitable sequence for performing 2×2 MIMO channel estimation 104.

The shorter training sequences 503 can each be used for SOP estimation 107 of the optical signal 201. That means, each shorter training sequence 503 can be provided as an input to the second equalizer 105 of the device 100 shown in FIG. 1, 3 or 4, in particular for performing the SOP estimation 107. In other words, the shorter training sequences 503 are suitable sequences for performing SOP estimation 107.

The training sequences 502, 503, i.e. Both the shorter training sequences 503 and the longer training sequence 502, may be built by using a PS-MP CAZAC sequence (i.e. Based on a PS-MP CAZAC code) or more generally using a Frank-Zadoff sequence. The sequence may be defined as:

$$c[n] = \text{Exp}\left(\pm j \frac{2\pi}{\sqrt{N}} (\text{mod}\{n, \sqrt{N}\} + 1)\left(\left\lfloor \frac{n}{\sqrt{N}} \right\rfloor + 1\right)\right),$$

Where N is the sequence length in symbols. The minimum number of distinct phases of the above polyphase code given by $\sqrt{N}$ Is obtained for sequences length $N=2^p$ Symbols with $p \in \{1, 2, 3, \ldots\}$. However, for lengths $N=2^{2p'}$ Symbols with $p' \in \{1, 2, 3, \ldots\}$ The constellation plot of a PS-MP CAZAC sequence refers to a log(N)PSK modulated signal (i.e. p'=1 refers to BPSK, p'=2 to QPSK, p'=3 to 8 PSK and so on).

The training sequences 502 and 503 for both the 2×2 MIMO channel estimation 104 and the SOP estimation 107, respectively, are defined as:

$$ts_x = \left[gi_{xf}, \underbrace{c_x, c_x, \ldots, c_x}_{\text{inclue x times } c_x}, gi_{xb}\right]$$

$$ts_y = \left[gi_{yf}, \underbrace{c_y, c_y, \ldots, c_y}_{\text{inclue x times } c_y}, gi_{yb}\right],$$

With $\chi \geq 1$. The PS-MP CAZAC blocks and the guard intervals (gis) are particularly defined as:

$c_x = [c[0], c[1], \ldots, c[N-1]]$, $c_y = [c[N/2], c[N/2+1], \ldots, c[N-1], c[0], c[1], \ldots, c[N/2-1]]$, $gi_{xf} = [c[N-N_{GI}], c[N-N_{GI}+1], \ldots, c[N-1]]$ $gi_{xb} = [c[0], c[1], \ldots, c[N_{GI}-1]]$ $gi_{yf} = [c[N/2-N_{GI}], c[N/2-N_{GI}+1], \ldots, c[N/2-1]]$ $gi_{yb} = [c[N/2], c[N/2+1], \ldots, c[N/2+N_{GI}-1]]$ In general, $N_{TS1} \ll N_{TS}$, e.g., for a 64 gbd system at $N_{TS}=96$ symbols (with a PS-MP CAZAC block of $N_{GI}=64$ symbols and including gis of length $N_{GI}=16$ symbols) and $N_{TS1}=4$ symbols (GI usually not required for SOP estimation).

In the following, training-aided 2×2 MIMO channel estimation) 104 and SOP estimation 107 are outlined for the FD (2×2 SOP Matrix FD estimation). The noiseless transmission system can be modeled as:

$$\begin{bmatrix} R_x[k] \\ R_y[k] \end{bmatrix} = \begin{bmatrix} H_{xx}[k] & H_{xy}[k] \\ H_{yx}[k] & H_{yy}[k] \end{bmatrix} \begin{bmatrix} C_x[k] \\ C_y[k] \end{bmatrix}$$

Where $R_x$, $R_y$ And $C_x$, $C_y$ Refer to the x- and y-polarization received and sent PS-MP CAZAC sequences in FD, respectively.

To perform the 2×2 MIMO channel estimation 104, the left and the right matrix of the above equation need to be multiplied from the left hand-side by:

$$\begin{bmatrix} C_x^*[k] & 0 \\ 0 & C_y^*[k] \end{bmatrix}$$

Such to obtain the following $H_A[k]$ and $H_B[k]$:

$$H_A[k] = R_x[k]C_{xI}^*[k] = H_x[k]C_x[k]C_x^*[k] + H_{xy}[k]C_x[k]C_y^*[k] =$$
$$H_{xx}[k]C_x[k]C_x^*[k] + H_{xy}[k]C_x[k]C_x^*[k]e^{\frac{jN}{2}}$$

$$H_B[k] = R_y[k]C_y^*[k] = H_{yy}[k]C_y[k]C_y^*[k] + H_{yx}[k]C_y[k]C_x^*[k] =$$
$$H_{yy}[k]C_y[k]C_y^*[k] + H_{yx}[k]C_y[k]C_y^*[k]e^{\frac{jN}{2}}$$

Transferring these $H_A[k]$ and $H_B[k]$ into the TD yields:

$h_A[n] = r_x[n] * c^*_x[n-N] = h_{xx}[n] * \delta_0[n] + h_{xy}[n] * \delta_{N/2}[n]$ $h_B[n] = r_y[n] * c^*_y[n-N] = h_{yy}[n] * \delta_0[n] + h_{yx}[n] * \delta_{N/2}[n]$ Where:

$$\delta_L[n] = \begin{cases} 1 & n = L \\ 0 & \text{Otherwise} \end{cases}$$

The TD windowing is required to extract the four channel components from $H_A[k]$ and $H_B[k]$ such that:

$h_{xx}[n] = h_A[n]\text{rect}[n]$ $h_{xy}[n] = h_A[n-N]\text{rect}[n]$ $h_{yx}[n]=h_B[n-N]\text{rect}[n]$ $h_{yy}[n]=h_B[n]\text{rect}[n]$ Where:

$$\text{rect}[n] = \begin{cases} 0 & N_{TDW} \geq n \leq N - N_{TDW} \\ 1 & \text{Elsewhere} \end{cases}$$

$N_{CIR} \leq N_{TDW} \leq N/4$

Since the 2×2 SOP estimation 107 is performed by the second 2×2 MIMO equalizer after the first 2×2 MIMO equalizer 102, the residual channel impulse response (CIR) is given only by the delta SOP rotation matrix, so that $N_{CIR}=1$ symbol.

In addition, knowing that the 2×2 SOP matrix is given by:

$$h_{SOP}[n] = \begin{bmatrix} h_v[n] & h_u[n] \\ -h_u^*[n] & h_v^*[n] \end{bmatrix}$$

The following averaging can be performed:

$h_v[n]=(h_{xx}[n]+h^*_{yy}[n])/2$ $h_u[n]=(h_{xy}[n]-h^*_{yx}[n])/2$

Based on the $h_v[n]$ And $h_u[n]$, the taps of the second 2×2 MIMO equalizer 105 can be calculated.

Since the second 2×2 MIMO equalizer 105 handles with data sampled at 1Sa/S the following matrix inversion is performed:

$w_{SOP}[n]=h_{SOP}^{-1}[n]$

If the second 2×2 MIMO equalizer 105 is implemented in FD, then four additional ffts are required to convert the four channel elements into the FD. In case the length of the second equalization 106 is different than that of the SOP estimation 107, zero-padding or truncation may be performed (usually at the TD windowing stage).

In the following, training-aided 2×2 MIMO channel estimation) 104 and SOP estimation 107 are outlined in detail for the TD (2×2 SOP Matrix TD estimation). In case the SOP estimation 107 is performed in TD (lower complexity for shorter training sequences) $h_A[n]$ and $h_B[n]$ can be obtained as:

$$h_A[i] = \sum_{n=0}^{N-1} r_x[\text{mod}\{n+i, N\}]c_x^*[n]$$

$$h_B[i] = \sum_{n=0}^{N-1} r_y[\text{mod}\{n+i, N\}]c_y^*[n]$$

For $i \in \{0, 1, 2, \ldots, N-1\}$.

The remaining operations are then carried out as described above for the FD case.

Figure 6:
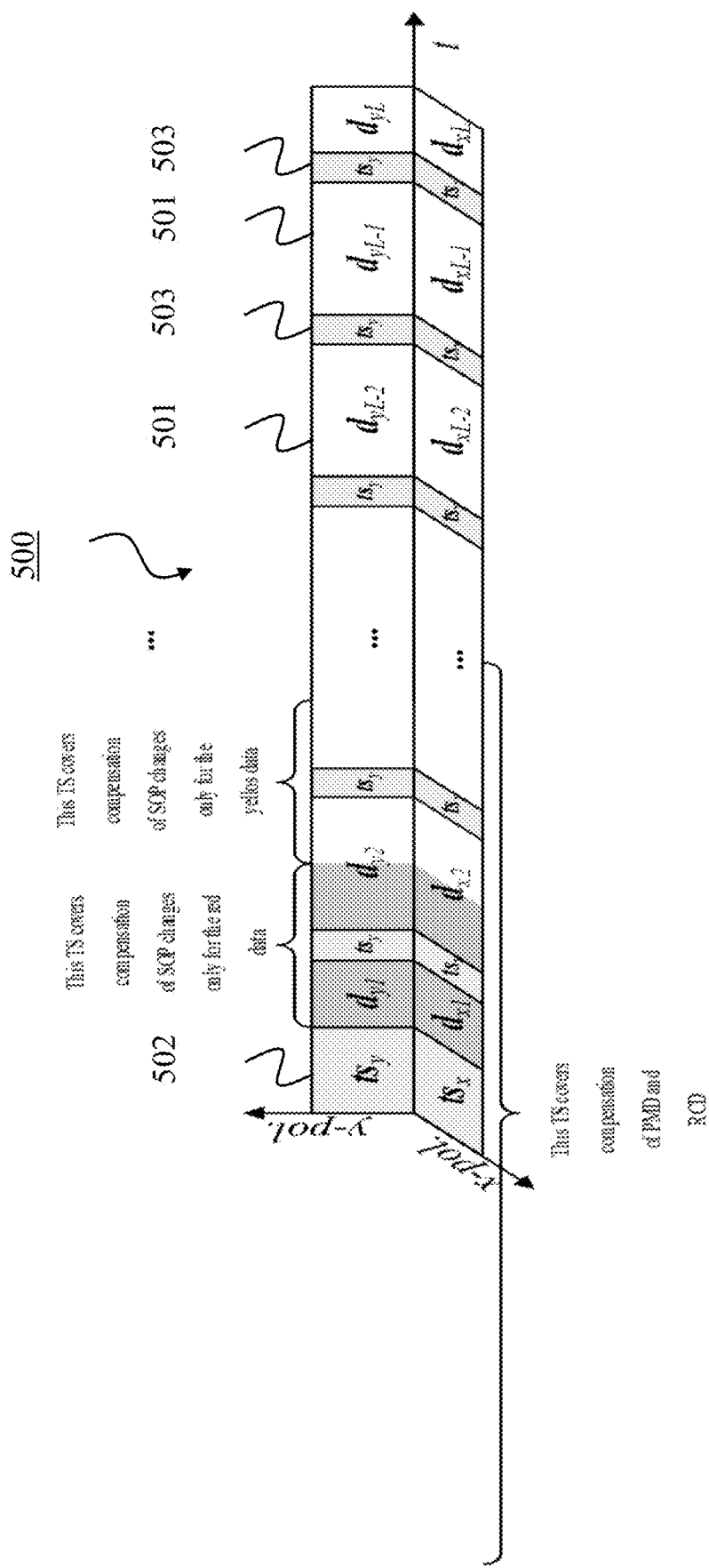
FIG. 6 shows training sequences in the frame of the optical signal for compensating slower and faster SOP changes.

FIG. 6 shows training sequences 502 and 503 in the frame 500 of the optical signal 201 that can be used for compensating slower and faster SOP changes. FIG. 6 specifically illustrates the equalization approach performed by the equalizing device 100 of FIG. 1, 3 or 4, based on the structure of the frame 500 of the optical signal 201 (as also shown in FIG. 5).

PMD, residual CD, and slower SOP changes can be compensated with support of 2×2 MIMO channel estimation 104 based on the first (longer) training sequence 502, particularly for data sequence 501 arranged prior and posterior this first training sequence 502. In a similar way, faster SOP changes can be compensated with support of SOP estimation 107 based on a given second (shorter) training sequence 503, particularly for data sequences 501 arranged prior and posterior the given second training sequence 503. That means, the second equalization 106 may be performed for a data sequence 501 arranged directly before a given training sequence 503 and for a data sequence 501 arranged directly after the given training sequence 503 in the frame 500. For instance, in FIG. 6 the second and third data sequences 501 (from the left side, i.e. The ones labeled $d_{y1}$, $d_{x1}$ and $d_{y2}$, $d_{x2}$) are compensated with support of SOP estimation 107 performed with the shorter training sequence 503 arranged in between these data sequences 501. The second and third data sequences 501 (i.e. The ones labeled $d_{y2}$, $d_{x2}$ and $d_{y3}$, $d_{x3}$) are compensated with support of SOP estimation 107 performed with the training sequence 503 arranged in between these data sequences 501. This approach is preferably carried out with a buffer, particularly one that enables equalization with half-frame delay.

Figure 7:
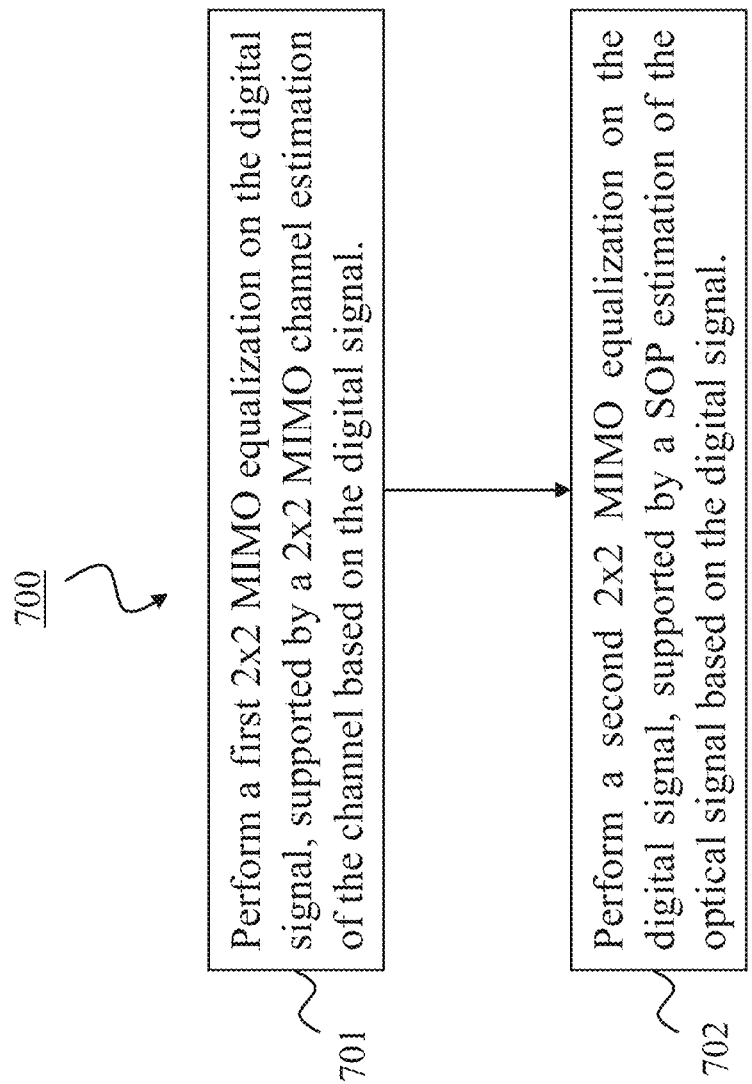
FIG. 7 shows a method according to an embodiment of the invention.

FIG. 7 shows a method 700 according to an embodiment of the invention. The method 700 is for processing a digital signal 101 derived from an optical signal 201 transmitted over a channel 202. The method 700 may be carried out by the device 100 shown in FIG. 1 (or FIG. 3 or 4) or by the optical receiver 200 shown in FIG. 2, The method 700 comprises a step 701 of performing a first 2×2 MIMO equalization 103 on the digital signal 101, supported by a 2×2 MIMO channel estimation 104 of the channel 202 based on the digital signal 201. This step 701 may be carried out by a first 2×2 MIMO equalizer 102. The method 700 also comprises a step 702 of performing a second 2×2 MIMO equalization 106 on the digital signal 101, supported by a SOP estimation 107 of the optical signal 201 based on the digital signal 101. This step 702 may be carried out by a second 2×2 MIMO equalizer 105.

Figure 8:
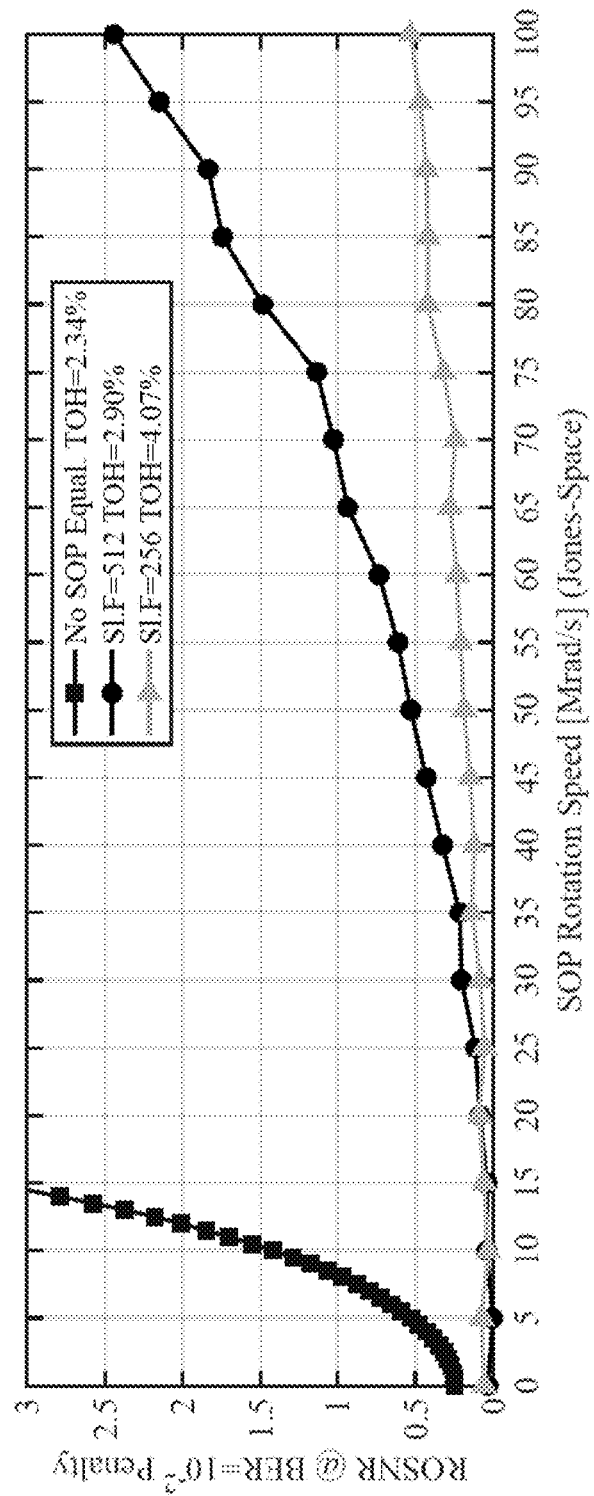
FIG. 8 shows a performance evaluation of an equalizing device according to an embodiment of the invention for 200G DP-QPSK.
Figure 9:
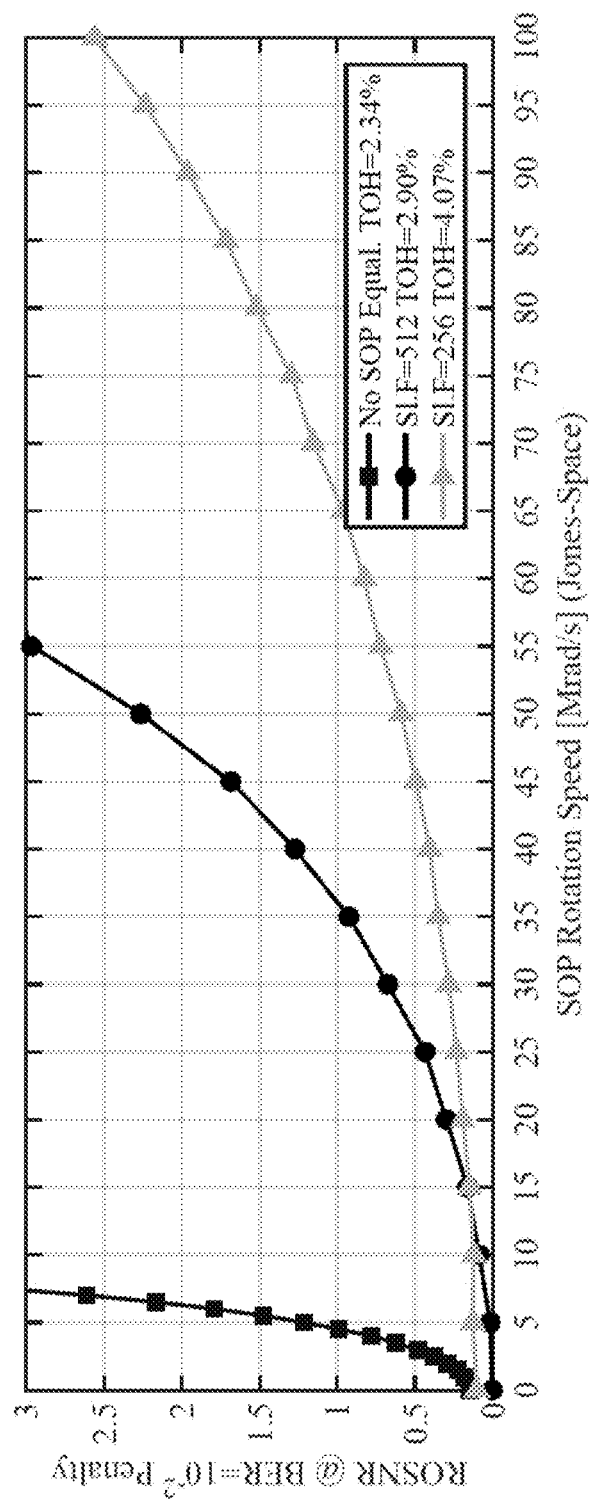
FIG. 9 shows a performance evaluation of an equalizing device according to an embodiment of the invention for 400G DP-16QAM.

FIG. 8 and FIG. 9 show simulation results as proof of concept for the device 100 and method 700, respectively. In particular, performance evaluation for 200G DP-QPSK (FIG. 8) and for 400G DP-16QAM (FIG. 9) is illustrated, respectively. It can be seen that in both cases, the device 100 performs significantly better (lower Required Optical Signal-to-Noise Ration (ROSNR) at a Bit Error Rate (BER) of $10^{-2}$ Penalty) for all SOP rotations, particularly faster SOP rotations up to 100 Mrad/s.

What is claimed is:

1. An equalizing device configured to process a digital signal derived from an optical signal transmitted over a channel, the equalizing device comprising:
   a first 2×2 multiple input multiple output (MIMO) equalizer configured to perform a first equalization on the digital signal, supported by a 2×2 MIMO channel estimation of the channel based on the digital signal, and a second 2×2 MIMO equalizer, arranged after the first equalizer, configured to perform a second equalization on the digital signal, supported by a state of polarization (SOP) estimation of the optical signal based on the digital signal.

2. The equalizing device according to claim 1, wherein:
   the first equalizer is configured to, by performing the first equalization, compensate residual chromatic dispersion (CD), polarization-mode dispersion (PMD), and changes of the SOP of the optical signal slower than a first threshold, and the second equalizer is configured to, by performing the second equalization, compensate changes of the SOP of the optical signal faster than the first threshold.

3. The equalizing device according to claim 1, wherein: at least one of the first equalizer and the second equalizer is a training-aided equalizer.

4. The equalizing device according to claim 1, wherein: the first equalizer is configured to perform the 2×2 MIMO channel estimation based on a first training sequence contained in the digital signal, and
the second equalizer is configured to perform the SOP estimation based on a second training sequence contained in the digital signal.

5. The equalizing device according to claim 1, wherein: the first equalizer is configured to perform the 2×2 MIMO channel estimation based on a first training sequence included in a frame of the optical signal, and
the second equalizer is configured to perform the SOP estimation individually for each of multiple additional training sequences included in the frame, wherein a length of each training sequence of the multiple additional training sequences is shorter than a length of the first training sequence.

6. The equalizing device according to claim 5, wherein: the second equalizer is configured to, by performing the SOP estimation for a particular training sequence of the multiple additional training sequences, perform the second equalization for a first data sequence arranged directly before the particular training sequence and for a second data sequence arranged directly after the particular training sequence in the frame.

7. The equalizing device according to claim 4, wherein: the first and second training sequences are based on Perfect-Square Minimum-Phase Constant-Amplitude Zero-Autocorrelation (PS-MP CAZAC) code.

8. The equalizing device according to claim 1, wherein: the first equalizer is implemented in the frequency domain (FD) or in the time domain (TD), and/or
the second equalizer is implemented in the FD or in the TD.

9. The equalizing device according to claim 1, further comprising:
a chromatic dispersion (CD) equalizer arranged before the first equalizer and configured to perform equalization on the digital signal, supported by a CD estimation of the optical signal based on the digital signal.

10. The equalizing device according to claim 9, comprising:
a dual-stage equalizer which includes the CD equalizer and the first equalizer, and
the second equalizer.

11. The equalizing device according to claim 9, further comprising:
a single-stage equalizer that includes the CD equalizer, the first equalizer, and the second equalizer.

12. The equalizing device according to claim 1, further comprising:
one or more Digital Signal Processors (DSPs) configured to perform digital signal processing on the digital signal that includes processing for symbol detection and/or processing of fractional oversampled data.

13. A method for processing a digital signal derived from an optical signal transmitted over a channel, the method comprising:
performing a first 2×2 multiple input multiple output (MIMO) equalization on the digital signal, supported by a 2×2 MIMO channel estimation of the channel based on the digital signal, and
performing a second 2×2 MIMO equalization on the digital signal, supported by a state of polarization (SOP) estimation of the optical signal based on the digital signal.

* * * * *